United States Patent Office 2,835,331
Patented May 20, 1958

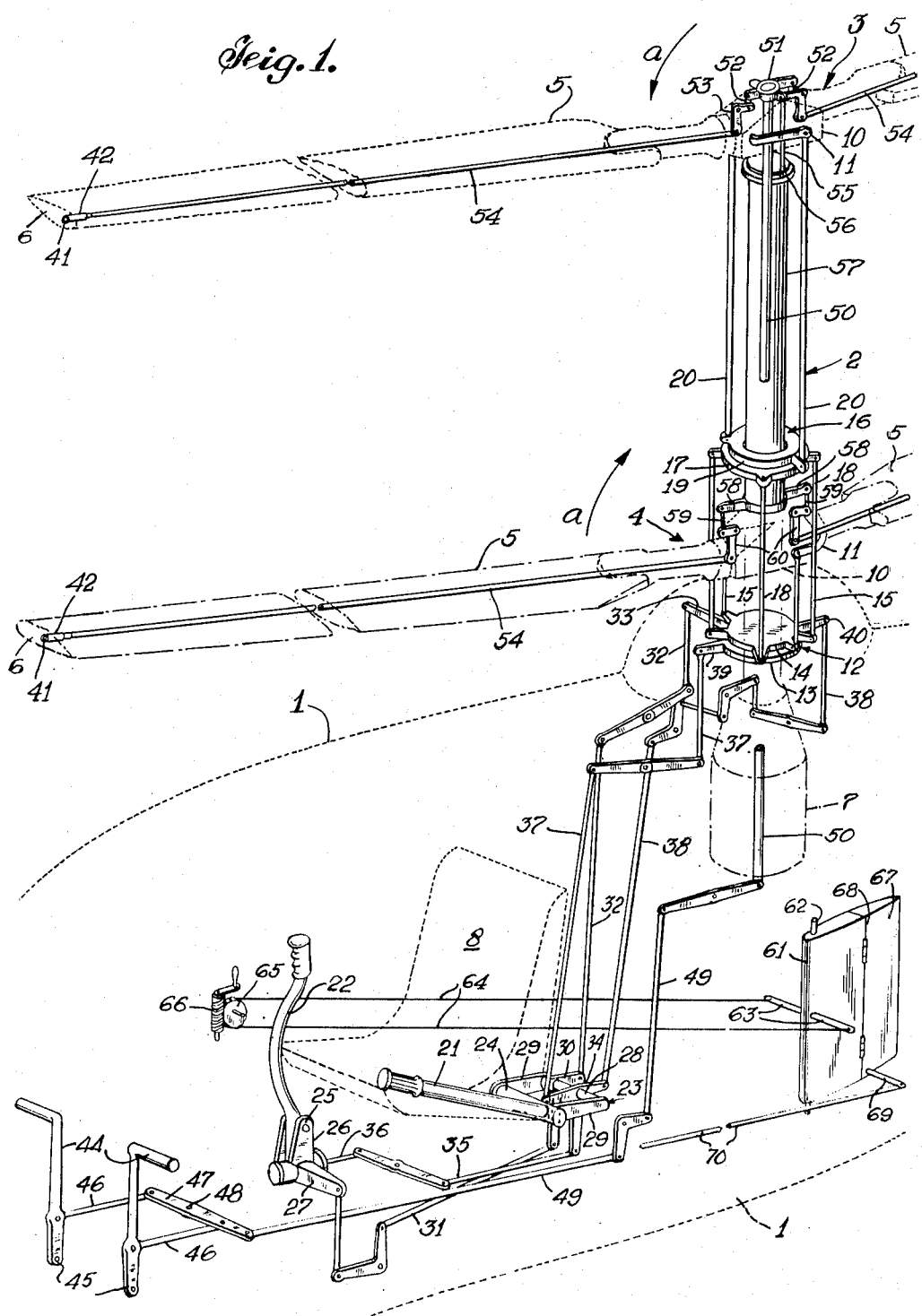

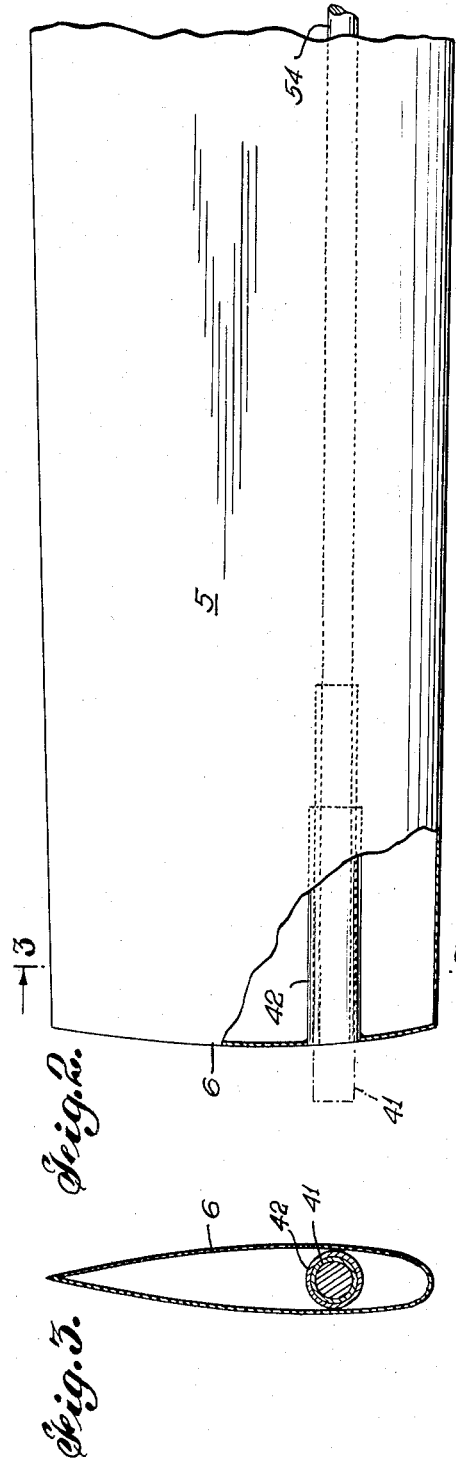
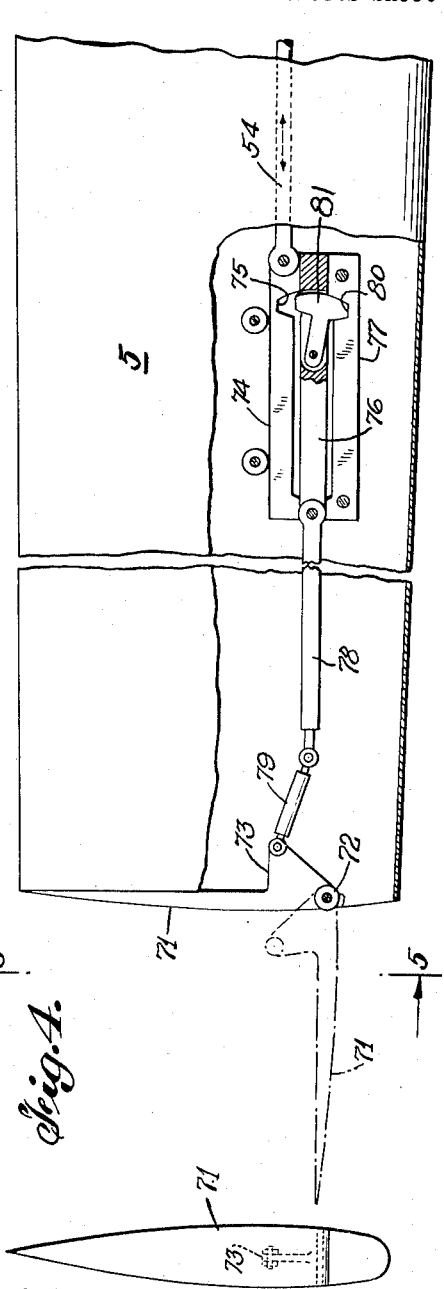
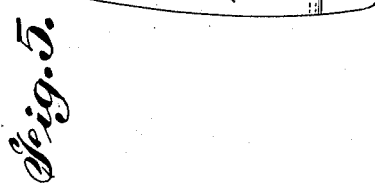

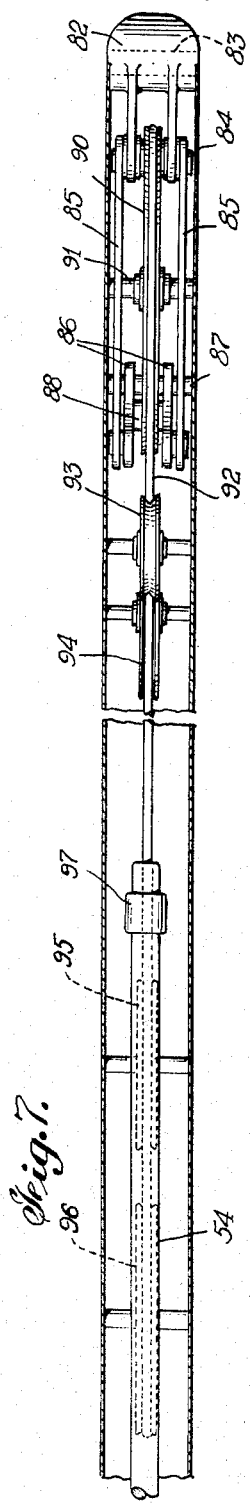
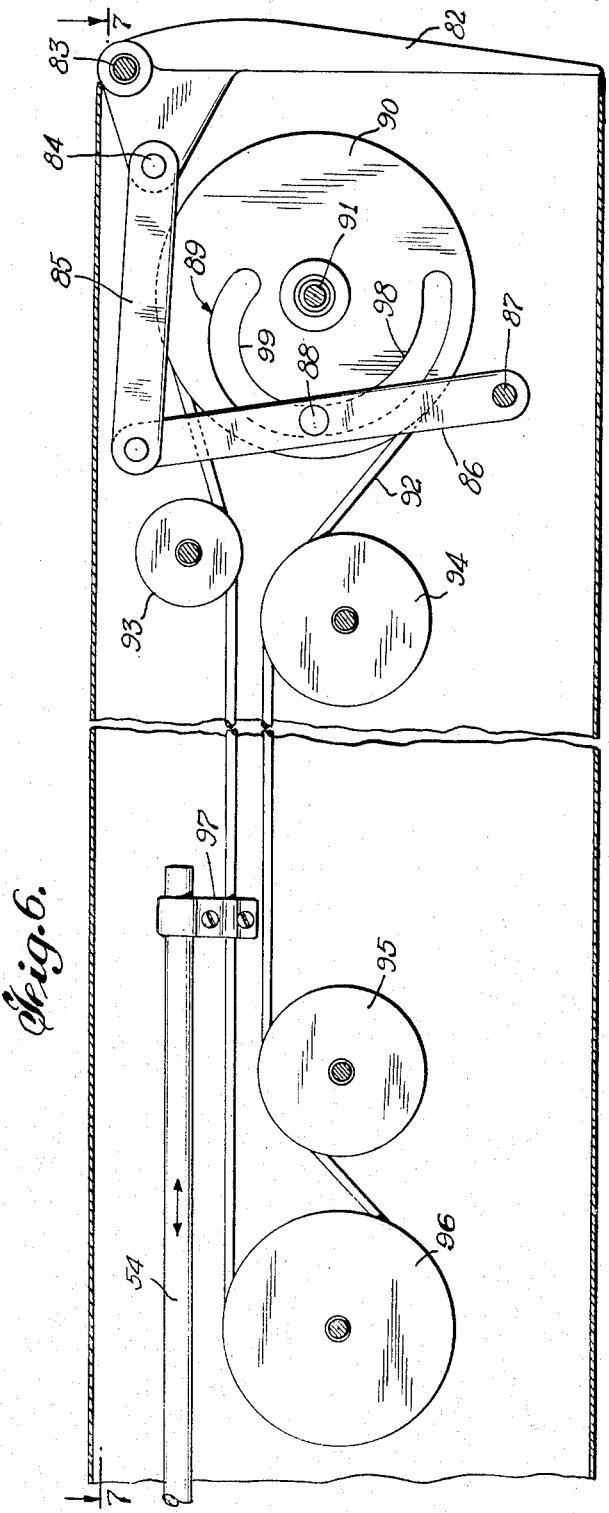

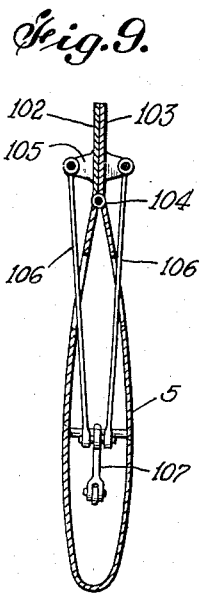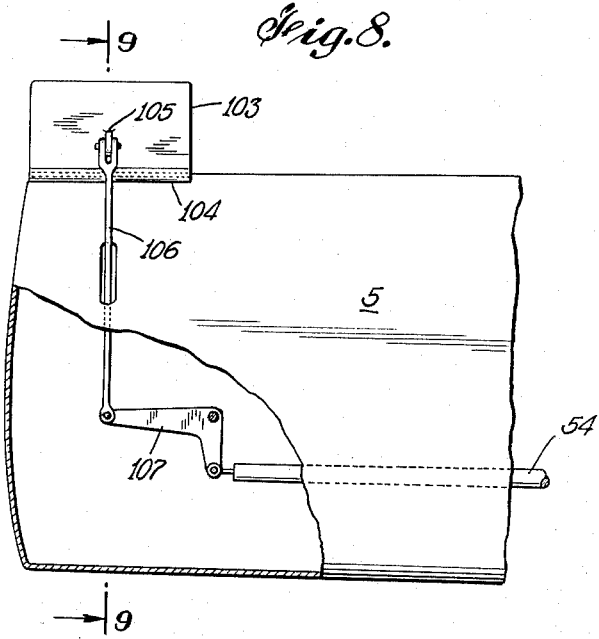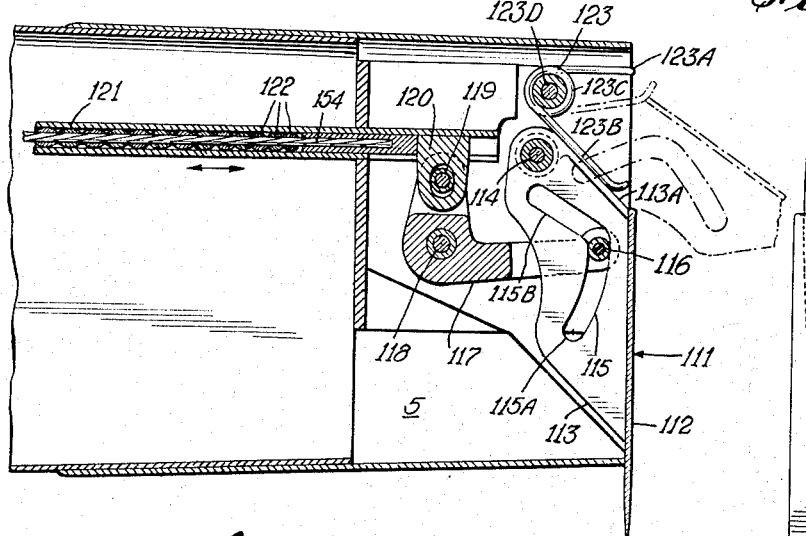

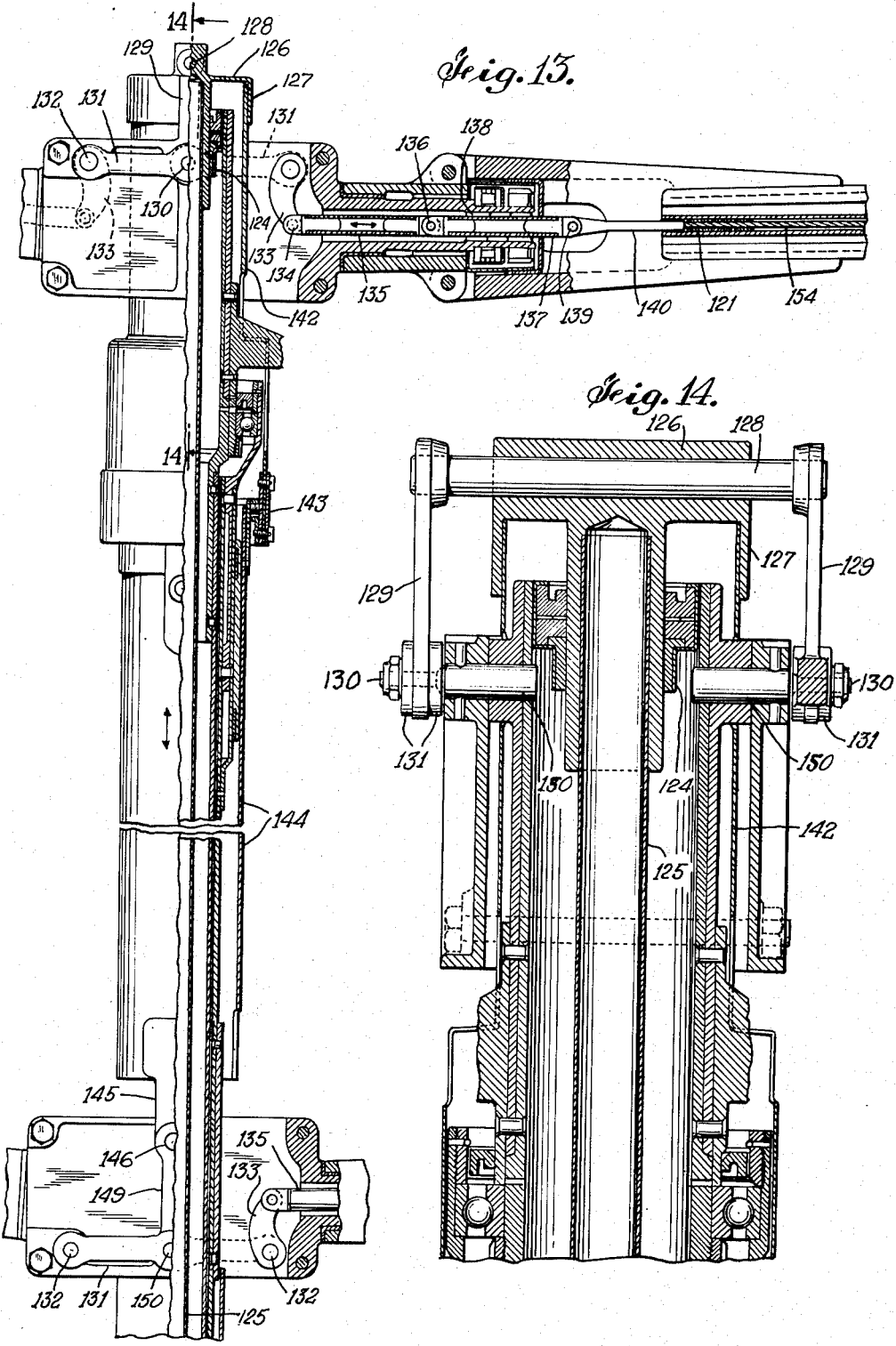

2,835,331

DIRECTIONAL CONTROL SYSTEM FOR ROTARY WING AIRCRAFT

James V. Ryan, Walter Bastedo, Jr., and Edward W. Strong, Stony Brook, and Arthur Marquis Losey, East Islip, N. Y., assignors to Gyrodyne Company of America, Inc., St. James, N. Y., a corporation of New York Application October 20, 1954, Serial No. 463,582

15 Claims. (Cl. 170—135.28)

The present invention relates to a directional control system for rotary wing aircraft having two load-carrying rotors turning in opposite directions. The invention is particularly applicable to helicopters having coaxial rotors one above the other, tandem rotors disposed one ahead of the other and rotors arranged side by side. While, for clarity of description, reference is herein made to rotary wing aircraft having "two" rotors, it will be understood that the invention is also applicable to aircraft having more than two rotors, the term "two" being in the sense of "at least two."

As a load-carrying rotor of a helicopter turns in the air, the blades or wings of the rotor provide lift and also develop drag. The drag of the rotor reacts through the rotor shaft and driving mechanism to produce torque tending to turn the fuselage of the helicopter in a direction opposite to that in which the rotor is turning. In a helicopter having a single load-carrying rotor, the reaction torque is customarily counterbalanced by a small rotor having an approximately horizontal axis, for example a tail rotor. In a helicopter having contra-rotating load-carrying rotors, the reaction torque of one rotor is balanced by that of the other so that no tail rotor is necessary. Directional control of the helicopter can be obtained by causing the reaction torque of one rotor to be greater than that of another so that there is a resultant torque tending to turn the helicopter fuselage.

It has previously been proposed to provide directional control for a helicopter with contra-rotating load-carrying rotors by varying the pitch of the rotor blades. If the pitch of the blades of one rotor is increased and the pitch of the other rotor is decreased, the drag of the first rotor is greater while that of the second rotor is diminished. This produces a torque differential that reacts through the rotor transmission and power unit and appears as torque tending to turn the fuselage of the aircraft about the approximately vertical axis of the rotor shafts. It is thus possible, by differential control of the rotor blade pitch, to control the directional heading of a helicopter.

The use of differential collective pitch to control the directional heading of a helicopter has been found satisfactory in "power on" flight, i. e. when the rotors are being driven by the engine. However, it has been found that, in "power off" (autorotative) or "partial power" flight, differential collective pitch control is not satisfactory. In moderate to high speed autorotative forward flight, the differential collective pitch control has a tendency to reverse in effectiveness, i. e. application of right rudder by the pilot gives rise to a left yaw, and vice versa; in zero speed or low speed autorotative flight with such a control system, the directional control becomes very "soft," and, in the case of coaxial rotors, the helicopter has a strong tendency to turn in the direction of rotation of the lower rotor. These effects present a serious problem in maneuvering the helicopter, and give rise to an accident hazard.

An object of the improved directional control system in accordance with the present invention is to provide positive control both in "power on" and "power off" flight, so that the pilot has full control of the aircraft at all times. A further object of the invention is to avoid reversal of the direction of control in going from "power on" to "power off" flight. With the control system in accordance with the invention, "right rudder" will turn the aircraft to the right and "left rudder" will turn the aircraft to the left, regardless of whether it is in "power on" or "power off" flight.

In accordance with the present invention, directional control of a rotary wing aircraft having contra-rotating load-carrying rotors is obtained by means of tip brakes on the rotor blades. The term "tip brake" is here used to designate an aerodynamic brake device disposed at or near the tip of the rotor blade and operable to increase the drag of the blade, preferably without materially affecting its lift. In order to avoid affecting the lift of the rotor blade, the aerodynamic brake device preferably projects beyond the tip of the blade when in active position so that it does not disturb the flow of air on the airfoil surfaces of the blade. While it is not as desirable, the brake can be located inboard from the extreme tip of the blade. However, in order to obtain adequate control without requiring a large and correspondingly heavy structure, the brake should be at or near the tip of the blade and preferably in the outboard quarter of the blade.

The tip brakes are operated by a control system actuated by a pilot-controlled steering member which may, for example, be in the form of rudder pedals, a rudder bar or a steering wheel. For convenience of description, the terms "rudder pedals" and "pilot-controlled steering member" are used interchangeably to designate any suitable pilot or automatic pilot-controlled steering means. The operation of the tip brakes is coordinated by the control system so that the tip brakes of one or another rotor are actuated selectively. With two load-carrying rotors turning in opposite directions, actuation of the tip brakes on one rotor while the tip brakes on the other rotor remain inactive produces a torque differential tending to turn the fuselage in a direction opposite to that of the rotor on which the tip brakes are actuated. In normal flight, the tip brakes are used only when it is desired to turn the aircraft, the tip brakes on both rotors being otherwise inactive.

Directional control by means of tip brakes may be combined with control by differential collective pitch of the rotor blades. Mechanism for controlling differential collective pitch may be connected to the rudder pedals or other steering means as in present practice. However, considerable simplification of controls can be achieved by having the differential collective pitch adjustable or trimmable rather than operable from the rudder pedals. In the presently preferred embodiment of the invention, provision is made for varying or adjusting the differential collective pitch of the rotors so that in steady hovering the torque of one rotor balances that of the other with the rotor pedals in neutral position so that none of the tip brakes is actuated. This adjustment can be made by means of adjustable connections in the collective pitch control mechanism of the blades, the adjustment being made when the aircraft is on the ground. The aircraft is also preferably provided with a vertical tail surface that is controllable or adjustable to counteract the difference in rotor torque when the aircraft is in forward flight at cruising speed. For example, this may be accomplished by an "in flight" trimming adjustment. By proper setting of the vertical control surface, the aircraft is held on a straight course in forward flight with the rudder pedals in neutral position, The tip brakes are thus inactive in steady hovering and in straight forward flight and hence absorb no power. When the tip brakes are actuated to turn the aircraft, a small amount of power is absorbed. It is estimated that the maximum power required to turn the aircraft is of the order of 1% to 1.5% of the hovering power. This is substantially less than the power required for driving the tail rotor of a single-rotor helicopter.

If additional control in forward flight is desired, the aircraft can be provided with a rudder controlled by a steering member in coordination with the action of the tip brakes. The nature and advantages of the invention will be more fully understood from the following description and claims in conjunction with the accompanying drawings, in which:

Fig. 1 is a schematic perspective view of a rotary wing aircraft directional control system in accordance with the invention.

Fig. 2 is a plan of the tip portion of one of the rotor blades having a tip brake, a portion of the blade being broken away to show the tip brake more clearly.

Fig. 3 is a cross section of the blade shown in Fig. 2 taken approximately on the line 3—3.

Figs. 4 and 5 are a plan and end view, respectively, of the tip portion of a rotor blade showing a second form of tip brake.

Fig. 6 is a plan of portions of a rotor blade showing an alternative form of tip brake operating mechanism.

Fig. 7 is a longitudinal section taken approximately on the line 7—7 in Fig. 6.

Fig. 8 is a plan of the tip portion of a rotor blade showing a third form of tip brake.

Fig. 9 is a cross section approximately on the line 9—9 in Fig. 8.

Fig. 10 is a plan view partially in horizontal section of the tip portion of a rotor blade showing a fourth form of tip brake.

Fig. 11 is a rear elevation of the blade tip shown in Fig. 10.

Fig. 12 is an end elevation of the blade tip shown in Fig. 10.

Fig. 13 is an elevation partly in section of the upper portion of rotor mast and root portions of the blades and showing tip brake control mechanism.

Fig. 14 is a fragmentary vertical section taken approximately on the line 14—14 in Fig. 13.

In Fig. 1 of the drawings, there is illustrated by way of example a directional control system in accordance with the invention embodied in a helicopter having two co-axial contra-rotating load-carrying rotors. The helicopter has a fuselage or frame 1 and a rotor head 2 comprising an upper rotor 3 and a lower rotor 4, each having a plurality of rotor blades or wings 5 with tip portions 6. The two rotors are driven in opposite directions, as indicated by the arrows $a$ in Fig. 1, by a suitable power plant (not shown) through a transmission 7 that includes a free-wheeling device or clutch permitting the rotors to rotate by auto-rotation in the event the engine stops or runs at a speed lower than that corresponding to rotor speed. The fuselage is provided with a pilot seat 8.

Each of the rotors comprises a hub portion 10 on which the rotor blades 5 are rotatably mounted so as to turn about a longitudinal axis to vary the pitch of the blades. The hubs 10 are in turn pivotally mounted on the respective rotor shafts by means of hinge pins which permit limited see-saw rocking of the rotors about axes approximately perpendicular to the rotor shafts and to the longitudinal axes of the rotor blades. Each of the rotor blades has a horn 11 which projects forwardly from the shank portion of the blade for the purpose of turning the blade about its longitudinal axis to change its pitch.

The helicopter has suitable controls for varying and regulating the pitch of the rotor blades both cyclically and non-cyclically. The pitch of the lower rotor blades is controlled by a lower swash plate 12 which is movable axially of the rotor shaft to vary the pitch non-cyclically and is tiltable in any direction to vary the pitch cyclically. The lower swash plate 12 comprises a lower non-rotating portion 13 and an upper portion 14 that rotates with the lower rotor and is connected at diametrically opposite points to the horns 11 of the rotor blades by lower rotor pitch rods 15. The pitch of the upper rotor blades is controlled by an upper swash plate 16 that is likewise movable axially and universally tiltable. The upper swash plate 16 comprises a lower portion 17 that rotates with the lower rotor and is connected by four equally spaced rods 18 with the rotating portion 14 of the lower swash plate 12 and an upper portion 19 that rotates with the upper rotor and is connected at diametrically spaced points to the horns 11 of the upper rotor by means of the upper rotor pitch rods 20. The connecting rods 15, 18 and 20 are preferably adjustable so as to adjust the pitch of the individual rotors and also adjust the pitch of the upper rotor blades relative to that of the lower rotor. By reason of the inerconnecting rods 18, axial or tilting movement of the swash plate 12 is imparted to the upper swash plate 16 so that the two swash plates move in unison.

Axial and tilting movement of the swash plates 12 and 16 to provide collective and cyclical pitch control is effected by a coordinated control system comprising a collective pitch control lever 21, a cyclic pitch control stick 22, and a cyclic-collective mixer 23 and suitable connections. The collective pitch control lever 21 is fixed to a sleeve 24 which is rotatably supported with its axis horizontal and transverse to the longitudinal axis of the aircraft so that the lever 21 which projects forwardly from the sleeve 24 is swingable up and down. The cyclic pitch control stick 22 is pivoted at 25 to a fixture 26 that is rotatable about a horizontal axis extending fore and aft of the aircraft and has a laterally projecting arm 27. The cyclic-collective mixer 23 comprises a shaft 28 that is parallel to a sleeve 24 and is carried by spaced arms 29 projecting rearwardly from said sleeve. A bell crank lever 30 rotatable on the shaft 28 has a downwardly projecting arm connected by linkage 31 to the laterally projecting arm 27 of the fixture 26 and a rearwardly projecting horizontal arm connected by linkage 32 to a radially projecting arm 33 on the lower portion 13 of the lower swash plate 12. A three-armed bell crank lever 34, that is also rotatable on the shaft 28 of the cyclic-collective mixer, has a downwardly projecting arm connected by linkage 35 to a plunger 36 connected to a lower end of the cyclic pitch control stick 22 and movable axially of the fixture 26 by fore and aft movement of the upper handle end of said stick. The bell crank lever 28 also has oppositely projecting horizontal arms connected by linkages 37 and 38, respectively, to diametrically opposite arms 39 and 40 on the non-rotating portion 13 of the lower rotor swash plate 12. The arms 39 and 40 are disposed at 90° from the aforementioned arm 33 on the swash plate.

It will be seen that, with the connections described, upward movement of the forward handle end of the collective pitch control lever 21 moves the shaft 28, and hence the bell crank levers 30 and 34, bodily downwardly, thereby causing equal upward movement of all of the arms 33, 39 and 40 of the lower swash plate. The lower swash plate 12 is thereby moved axially upwardly to increase the pitch of the lower rotor blades. By reason of the connecting rods 18, the upper rotor swash plate 16 is likewise moved axially upwardly to increase the pitch of the upper rotor blades. Lateral movement of the upper handle end of the cyclic pitch control stick 22 causes fixture 26 to pivot about its fore and aft axis and this movement is transmitted through the arm 27, the linkage 31, bell crank lever 30 and linkage 32 to the arm 33 of the lower swash plate so as to tilt the swash plate about an axis perpendicular to the arm 33.

Fore and aft movement of the upper handle end of the cyclic pitch control stick 22 produces fore and aft movement of the plunger 36. This movement is transmitted by the linkage 35 to the three-armed bell crank lever 34, causing the bell crank lever to turn about the shaft 28 so that one of the horizontal arms of the bell crank 34 moves up and the other moves down. The pivotal movement of the bell crank lever 34 is transmitted by the linkages 37 and 38 to the opposite arms 39 and 40 of the lower rotor swash plate 12 so as to tilt the swash plate about an axis that is perpendicular to the diameter connecting the arms 39 and 40 and thereby perpendicular to the axis about which the swash plate is tilted by the arm 33. Tilting of the lower rotor swash plate 12 is transmitted by the connecting rods 18 to the upper swash plate 16. The cyclic-collective mixer 23 makes it possible to combine translational axial movement of the swash plates for collective pitch control with lateral and/or longitudinal tilting of the swash plates for cyclic pitch control. Collective pitch control of the rotors provides for ascent and descent of the helicopter while cyclic pitch control provides azimuthal control of the helicopter and thereby also makes it possible to control translational flight of the helicopter by tilting of the rotor system in the desired direction so that the lift provided by the rotor system has a horizontal component.

The directional heading of the fuselage is controlled by means of tip brakes on the rotor blades. In the embodiment of the invention illustrated in Figs. 1 to 3, the tip brakes are shown in the form of plungers 41 slidable longitudinally in guideways 42 which are disposed lengthwise of the rotor blades 5 and open at the tips 6 of the blades. The plunger 41 is of any desired shape, for example flat, triangular, or rectangular, being shown in the form of a cylindrical tube. In neutral position, the plunger 41 has its outer end substantially flush with the tip 6 of the rotor blade 5. In active position, the plunger 41 projects a controllable varying amount beyond the tip of the blade, as indicated by broken lines in Fig. 2. To simplify the operating mechanism for the tip brakes, the plunger 41 is preferably also movable inwardly from its neutral position an amount approximately equal to the outward movement of the plunger. This permits the operating mechanism to move in either direction from a neutral or "straight ahead" position without the need of any compensating or lost motion connections. While flap means may be provided for closing the opening in the tip of the blade when the plunger 41 is in its inner position, this has been found to be unnecessary since the opening causes no ill effects if the blade tip is properly shaped. When the plunger 41 is in either neutral position or inner position, it is said to be "inactive." When the plunger 41 projects beyond the tip of the blade, it produces drag and is hence referred to as being "active." The plunger 41 is preferably symmetrical about a horizontal median plane so that, when the plunger is projected, it produces drag without producing material positive or negative lift. It is found preferable for structural and aerodynamic reasons to locate the plunger 41 approximately in line with the neutral axis of the airfoil section of the blade. The tip brakes can be of small size and yet provide adequate control. For example, if each tip brake has a projected area equivalent to a flat plate area of three square inches in fully extended position, the control provided is adequate for a helicopter having a rotor diameter of approximately fifty feet.

Coordinated mechanism is provided for actuating the tip brakes so that the tip brakes of the oppositely rotating rotors can be actuated selectively. Movement of the tip brakes of one rotor to active position, while the tip brakes of the other rotor remain inactive, produces a reaction torque tending to turn the fuselage of the helicopter in a direction opposite to the direction of rotation of the rotor the tip barkes of which are actuated. The amount of reaction torque thus produced is controlled by controlling the degree of actuation of the tip brakes.

As illustrated in Fig. 1, the tip brake control system comprises "rudder pedals" 44 pivotally mounted at 45 on a suitable support in the fuselage and connected by links 46 to a cross bar 47 pivotally supported at 48. One end of the cross bar 47 is connected by linkage 49 to a master brake tube 50 which extends up through the tubular coaxial shafts of the rotors. The tip brake tube 50 is movable in axial direction and is provided at its upper end with a collar 51 which is rotatable relative to the tube 50 but is movable with it in an axial direction. Diametrically projecting arms on the collar 51 are connected by short links 52 to horizontal arms of bell crank levers 53 that are pivotally mounted in the hub 16 of the upper rotor and have downwardly projecting arms connected to push-pull rods 54 that extend longitudinally of the rotor blades and are adjustably connected to the tip brake plungers 41. Another pair of arms on the collar 51 is connected by rods 55 to a rotatable collar 56 on the upper end of a lower rotor tip brake sleeve 57 that surrounds the upper rotor shaft and extends downwardly through the inside of the swash plate 16 to a point just above the hub 10 of the lower rotor. The rotatable collar 56 permits the lower rotor tip brake sleeve 57 to rotate with the lower rotor while the collar 51 on the upper end of the master tip brake tube 50 rotates with the upper rotor. At its lower end, the lower rotor tip brake sleeve 57 is provided with oppositely projecting arms 58 connected by links 59 to horizontal arms of bell crank levers 60 that are pivotally mounted on the lower rotor hub 10 and have downwardly projecting arms connected to push-pull rods 54 extending longitudinally of the lower rotor blades 5 and adjustably connected at their outer ends to the tip brakes of the lower rotor blades. With the connections shown, movement of the rudder pedals 44 produces axial movement of the master tip brake tube 50 and the lower rotor tip brake sleeve 57 and lengthwise movement of the push-pull rods 54 connected to the tip brakes. It will be noted that the bell cranks 53 of the upper rotor and bell cranks 60 of the lower rotor are reversed relative to one another. Hence, downward movement of the master tip brake tube 50 from a neutral position moves the tip brakes of the upper rotor from neutral to active position while retracting the tip brakes of the lower rotor from neutral to inner position so that the lower rotor tip brakes remain inactive. Conversely, upward movement of the master tip brake tube 50 from a neutral position actuates the lower rotor tip brakes while the upper rotor tip brakes remain inactive. Selective operation of the tip brakes is thereby provided.

To provide maximum efficiency, it is desirable to trim the aircraft so that the tip brakes do not need to be used except when maneuvering the aircraft. For this purpose, the collective pitch of the rotors is adjusted, for example by means of the adjustable connecting rods 18 or 20 (Fig. 1) so that, in steady hovering, the reaction torque of the upper rotor balances that of the lower rotor and there is hence no tendency to yaw. As a helicopter goes from hovering into forward flight, there is a slight change in the relative torque reactions of the rotors, owing to the different air flow pattern. To compensate for the resulting slight torque unbalance, the aircraft is preferably provided with a trimmable airfoil surface for producing a counter-acting torque in forward flight. Moreover, it is desirable, in some instances, to effect control of differential collective pitch and control of a rudder or other airfoil surface in conjunction with the control of the tip brakes. For example, differential collective pitch of the rotors may be controlled from the rudder pedals. Likewise, the aircraft may be provided with a rudder controllable from the rudder pedals, as is customary in fixed wing aircraft. In the embodiment illustrated in Fig. 1, a vertical airfoil surface 61 is mounted on a tail portion of the fuselage so as to swing about an approximately vertical axis 62. The control surface 61 is trimmable by means of laterally projecting arms 63 connected to the opposite ends of a cable 64 that passes over, and is preferably secured to, a pulley 65 rotatable by suitable mechanism such as a worm drive 66. A rudder 67 is pivotally connected to the control surface 61 at 68 and is provided with a laterally projecting arm 69 connected by a link 70 to the linkage 49 that connects the rudder pedals 44 with the tip brakes.

With the tip brake pedals 44 in neutral position, and hence with all tip brakes inactive, the differential collective pitch of the rotors is adjusted as described above so that, in steady hovering, the aircraft has no tendency to yaw. The aircraft is then flown forward at cruising speed and the control surface 61 is adjusted by means of the trimming mechanism 65, 66 so that the aircraft maintains its heading with the tip brake pedals 44 in neutral position. With the differential collective pitch and the control surface 61 thus adjusted, there is no need of using the tip brakes except when it is desired to change the directional heading. In the embodiment illustrated in Fig. 1, the rudder 67 and the tip brakes are both controlled from the rudder pedals 44. However, it will be understood that such rudder control may be omitted, in which event the airfoil surface 61 and articulated rudder 67 are preferably replaced by a control surface that is trimmable but is not operable from the rudder pedals.

It will be seen that the directional control system in accordance with the invention is not only highly efficient but also much simpler than the systems heretofore available.

The tip brakes may assume a variety of forms, several of which are shown by way of example in Figs. 2 to 14. The form shown in Figs. 2 and 3 is described above. In Figs. 4 and 5, the tip brake is shown in the form of a member 71 that is pivotally connected to the tip portion of the rotor blade at 72 and has an inwardly projecting arm 73. In inactive position, the brake member 71 conforms to the airfoil configuration of the tip portion of the blade, as shown in solid lines. By means of the tip brake operating mechanism, the brake member 71 can be swung out to or toward the broken line position shown in Fig. 4, thereby becoming effective to increase the reaction torque of the rotor to provide directional control for the helicopter. The brake members 71 may be of suitable size and so mounted that they can swing inside the tip portion of the blade from the neutral to an inner position when the tip brake actuating mechanism is operated to actuate the tip brakes of the other rotor. Alternatively, the operating mechanism may be provided with a selector device so that movement of the operating mechanism in one direction from neutral position moves the tip brakes to active position while movement of the operating mechanism in the opposite direction from neutral position does not move the tip brakes. A device of this character is illustrated schematically in Fig. 4 and comprises a bar 74 connected to the push-pull rod 54 of the tip brake operating mechanism described above. The bar 74 is provided with a notch 75. A similar bar 76 is disposed between the bar 74 and a fixed block 77 and is connected to the arm 73 of the tip brake member 71 by means of a push-pull rod 78 and an adjustable link 79. The block 77 has a notch 80 in the side facing the bar 76. A T-shaped dog 81 is pivotally mounted in a recess in the bar 76 so as to swing between a position in which it engages in the notch 75 of the bar 74 and a position in which it engages in the notch 80 of the fixed block 77. Upon movement of the push-pull rod 54 toward the left from the neutral position shown, the bar 74 engages the tip of the dog 81 and swings it into engagement with the notch 75 of bar 74, thereby locking the bars 74 and 76 together so that the movement of the rod 54 is transmitted to the brake member 71 to swing the brake member to active position. If the push-pull rod 54 is then moved toward the right, the bars 74 and 76 remain locked together until they reach the neutral position shown in Fig. 4, whereupon the force exerted on the dog 81 by the bar 74 swings it into the notch 80 of the fixed block 77, thereby locking the brake member 71 in closed or inactive position. Disengagement of the dog 81 from the notch 75 of bar 74 permits the push-pull rod 54 to be moved toward the right from neutral position, as occurs when the tip brake mechanism is operated to move the tip brakes of the other rotor to active position. The dog 81 is shaped so that it is swung as described by a cam and lever action.

In Figs. 6 and 7, there is shown a tip brake like that of Figs. 4 and 5 but with a different form of operating mechanism. The tip brake comprises a member 82 that is pivotally connected to the tip of the blade at 83 near the leading edge. An arm 84 projects inwardly from the tip brake member 82 near its pivoted end. The arm 84 of the tip brake member 82 is connected by a pair of parallel spaced links 85 to a pair of similarly spaced levers 86 pivotally supported at 87 on the rotor blade structure. A roller 88 on a pin extending between the two levers 86 engages in a cam slot 89 of a pulley 90 rotatably supported by a shaft 91. The pulley 90 is rotatable by means of a cable 92 that runs over guide pulleys 93, 94, 95 and 96 and is connected to the push-pull rod 54 of the tip brake control system by a clamp 97. Reciprocable movement of the push-pull rod 54 produces oscillatory movement of the pulley 90. The cam slot 89 in the pulley 90 has an arcuate portion 98 concentric with the pulley shaft 91 and a portion 99 that spirals in toward the shaft. Movement of the push-pull rod 54 toward the left from the neutral position shown in Fig. 6 causes the pulley 90 to turn in a counterclockwise direction. Engagement of the roller 88 in the spiral portion 99 of the cam slot 89 causes the levers 86 to swing toward the right, thereby swinging the tip brake member 82 outwardly to active position. Upon movement of the push-pull rod 54 toward the right from the neutral position shown, the roller 88 on the levers 86 engages in the concentric portion 98 of the cam slot 89 so that the tip brake member 82 is maintained in inactive position. It will thus be seen that the cam arrangement shown in Figs. 6 and 7 serves the same purpose as the selector device illustrated in Fig. 4 in that the tip brake is moved to active position by movement of the operating mechanism in one direction from neutral position and is maintained in inactive position during movement of the operating mechanism in the opposite direction from neutral position.

In Figs. 8 and 9, the tip brake comprises a pair of flat brake members 102 and 103 hingedly connected at 104 to the trailing edge of the tip portion of the rotor blade. The brake members 102, 103 are operable by means of arms 105 which project outwardly from the brake members near the hinge 104 and are connected to the push-pull rod 54 of the tip brake operating mechanism through links 106 and a bell crank lever 107. The brake members 102, 103 are shown in inactive or neutral position in Fig. 9. Movement of the push-pull rod 54 toward the right in Fig. 8 causes the brake members 102 and 103 to swing away from one another in the form of a V, thereby providing drag. The control mechanism is provided with suitable lost motion connections or with selector devices, as illustrated by way of example in Fig. 4, to permit actuation of the tip brakes on the other rotor without movement of the rod 54 toward the left from the position shown in Fig. 8.

In the rotor head of a helicopter, the space available for control members is very limited. There are also strict limitations on the amount of control movement that is permissible. In Figs. 10 to 12, there is shown a preferred form of tip brake which makes possible unlimited braking effort irrespective of rotor blade size and with limited movement of the control members by which the tip brake is actuated. Figs. 13 and 14 show a preferred arrangement of that portion of the tip brake control mecahnism that is located in the rotor head.

Figs. 10 to 12 show a tip brake 111 comprising a plate 112 carried by a web 113 which is substantially perpendicular to the plate and has a flange portion 113A at its forward edge. The web 113 is pivotally supported at 114 in the outer end portion of the rotor blade 5 and near the leading edge of the blade. The tip brake 111 is swingable about the pivot 114 from the "closed" position shown in solid lines to a variable "open" position as shown, for example, in broken lines. The plate 112 of the tip brake is of any desired size to provide tip brake action of the magnitude required, and, as illustrated in Fig. 12, is substantially larger than the cross section of the rotor blade tip. In its closed position, the plate 112 constitutes a fin at the tip of the blade. While the air resistance of the plate 112 in this position is very small, it can be reduced still further by rounding the front edge of the plate and feathering the rear edge, as shown. The plate can also be curved convexly outwardly, as seen in plan, for example with a radius approximately equal to that of the rotor, but this is ordinarily found unnecessary.

The web 113 of the tip brake is provided with a cam slot 115 engaged by a roller 116 carried by one arm of a bell crank lever 117 which is pivotally supported by the rotor blade at 118. The other arm of the bell crank lever 117 is pivotally connected at 119 to a fitting 120 at the outer end of a control cable 154 which extends longitudinally of the rotor blade through a tube 121 in which it is shown guided by a multiplicity of preferably contiguous beads 122. The end portion of the tube 121 guides the fitting 120 and is suitably slotted to accommodate the fitting. The control cable 154 corresponds to the control rod 54 in the embodiments described above, it being understood that a control cable or control rod may be used interchangeably. The arms of the cell crank 117 are preferably bifurcated so as to straddle respectively the web 113 of the tip brake and the apertured outer end of the control cable fitting 120.

Longitudinal movement of the control cable 154 produces angular movement of the bell crank 117 about its pivot 118. The bell crank is shown in its normal, or intermediate, position. The slot 115 in the web 113 of the tip brake comprises a portion 115A that is concentric with the pivot 118 of the bell crank and a portion 115B that slopes or spirals inwardly toward the bell crank pivot. Hence, if the bell crank 117 is swung in a clockwise direction from the normal position shown, the roller 116 travels in the concentric portion 115A of the slot 115 and the tip brake remains in its closed position. Movement of the bell crank in a counterclockwise direction from the normal position shown causes the roller 116 to engage the portion 115B of the cam slot so as to swing the tip brake 111 outwardly, as indicated in broken lines in Fig. 10. The outward movement of the tip brake, and hence the braking effort produced by it, depends on the movement of the bell crank 117, and hence that of the control cable 154.

A spring 123 acts on the tip brake 111 tending to swing it to closed position. As illustrated in Fig. 10, the spring comprises arms 123A and 123B and a central portion 123C comprising helical turns around a fixed post 123D. The arms 123A and 123B of the spring act respectively against a fixed part and the flanged edge 113A of the web 113 carrying the tip brake plate 112. The spring 123 is preferably of sufficient strength to balance, at least approximately, the centrifugal force acting on the tip brake. It will be noted that the cable 154 acts in tension to swing the tip brake out to active position. While the cable 154 guided by the tube 121 will also act in compression, it is less effective in that direction. With the arrangement shown, the tip brake is moved from active to inactive position at least primarily by the spring 123 so that the cable 154 is not required to exert any substantial effort in a compressive direction.

Longitudinal movement of the control cables 154 to actuate the tip brakes is effected by any suitable control system, for example a system like that shown in Fig. 1 for actuating the control rods 54.

Figs. 13 and 14 show a preferred form of the portion of the control system that extends up through the rotor shafts and out into the rotor blades. A tip brake actuating tube 125 extends up through the inside of the rotor shafts and is movable in a longitudinal direction by suitable control means, for example that shown in Fig. 1 for actuating the tip brake tube 50. At its upper end, the actuating tube 125 is guided by a bearing 124 which engages a cylindrical inner skirt portion of a fitting 126 fixed to the upper end of the tube. The fitting 126 has a depending outer skirt portion 127 and carries a cross pin 128. At opposite ends of the cross pin 128, there are links 129 each of which is pivotally connected at 130 to the outer end of an arm 131 fixed on a shaft 132 that extends transversely of the rotor hub. The shaft 132 carries a second arm 133 that is disposed inside the rotor hub and is pivotally connected at 134 to a link 135, the other end of which is connected at 136 to a second link 137. Each of the links 135 and 137 is shown as comprising a short length of tubing with plug-type fittings at its ends. The link 137 is guided for longitudinal movement by bushings 138 while the link 135 is free to swing so as to accommodate the angular movement of the arm 133. At the outer end of the link 137, there is an apertured fork to provide a pivotal connection 139 to a fitting 140 on the inner end of the control cable 154.

Upward movement of the actuating tube 125 produces upward movement of the links 129, and hence of the inner ends of the arms 131 on shafts 132. The arms 133 on the same shafts are thereby swung inwardly, pulling the control cables 154 inwardly toward the axis of the rotor shafts. Conversely, downward movement of the actuating tube 125 moves the control cables in the opposite direction. As one of the links 129 is connected to the control arm 131 for the tip brake on one blade of the upper rotor while the opposite link 129 is connected to the control arm for the tip brake on the other upper rotor blade, the tip brakes on both blades of the upper rotor are actuated simultaneously and in the same sense. In the rotor system illustrated by way of example in Figs. 13 and 14, the rotor blades are carried by a hub which is pivotally connected to the rotor shaft so as to be capable of limited "seesaw" movement relative to the shaft. As the pivots 130 of the tip brake control system, when in normal position, coincide with the seesaw axis of the rotor hub, any tilting movement of the rotor about this axis has no effect on the operation of the tip brakes.

The tip brakes on the blades of the lower rotor are actuated through a longitudinally movable control tube 142 secured at its upper end to the outer skirt portion 127 of the fitting 126 on the upper end of the tip brake actuating tube 125. At its lower end, the tube 142 is connected by means of a thrust bearing 143 to a lower sleeve or tube 144. The bearing 143 permits the lower tube 144 to rotate with the lower rotor while the upper tube 142 rotates with the upper rotor, and hence in the opposite direction. At diametrically opposite sides of its lower end, the tube 144 is provided with downward extensions 145 which may be integral with the tube but are shown as separate pieces welded on. Each of the extensions 145 is pivotally connected at 146 to a link 149 corresponding to the links 129 of the upper rotor. The two links 149 disposed at opposite sides of the rotor shaft are connected respectively with tip brake operating arms 131 on shafts 132, each of which also carries a second arm 133 inside the rotor hub. The inner arms 133 are connected to the respective tip brake control cables extending out through the rotor blades in the same manner as described above for the upper rotor. The pivotal connections 146 of the lower rotor tip brake operating mechanism, when in normal position, are coaxial with the seesaw axis of the lower rotor so that the operation of the tip brakes is not affected by the tilting of the rotor.

It will be seen that the transverse shafts 132 carrying the tip brake control arms 133 of the upper rotor are disposed above the longitudinal axes of the rotor blades while the corresponding shafts 132 of the lower rotor are below the axes of the lower rotor blades. Thus, the connections are similar but reversed so that the tip brake control cables of the lower rotor are moved oppositely to those of the upper rotor. In normal position of the control system, the tip brakes of both the upper and lower rotors are closed, being in the position shown in solid lines in Fig. 10. Upward movement of the actuating tube 125 from the normal position causes the tip brakes on both lower rotor blades to be actuated simultaneously and equally while the upper rotor tip brakes remain closed. Conversely, downward movement of the control tube 125 causes actuating of the upper rotor tip brakes while the tip brakes of the lower rotor remain in closed position.

While the rotor systems shown by way of example in the drawings and described above utilize two-bladed seesaw rotors, it will be understood that the present invention is in no way limited to such rotor configuration. It will also be apparent that the features of the several embodiments herein shown and described are mutually interchangeable insofar as they are not incompatible and that still other modifications may be made within the scope of the invention as defined by the appended claims.

What we claim and desire to secure by Letters Patent is:

1. In a rotary wing aircraft having a fuselage and two load-carrying rotors turning in opposite directions at a predetermined speed ratio relative to one another and having rotor blades, means for controlling the directional heading of the fuselage comprising aerodynamic brakes at the tips of said rotor blades, and means for selectively actuating said tip brakes of a rotor turning in one direction while the tip brakes of a rotor turning in the opposite direction are inactive to produce a reaction torque differential tending to turn the fuselage about a vertical axis.

2. In a rotary wing aircraft having a fuselage and two coaxial load-carrying rotors turning in opposite directions at a predetermined speed ratio relative to one another and each having rotor blades, means for controlling the directional heading of the fuselage comprising aerodynamic brakes at the tips of said rotor blades and means for selectively controlling said tip brakes to apply said tip brakes of one of said rotors while the tip brakes of the other of said rotors are inactive, to produce a reaction torque differential tending to turn the fuselage about the axis of said rotors in a direction opposite to that of the rotor the tip brakes of which are applied.

3. In a rotary wing aircraft having a fuselage and two load-carrying rotors turning in opposite directions at a predetermined speed ratio relative to one another and having rotor blades, means for controlling the directional heading of the fuselage comprising aerodynamic brakes at the tips of said rotor blades, a pilot-controlled steering member movable in opposite directions from a neutral position, and differential connections between said steering member and said tip brakes to apply the tip brakes of one of said rotors by movement of the steering member in one direction from said neutral position and to apply the tip brakes of the other of said rotors by movement of the steering member in the opposite direction from said neutral position.

4. In a rotary wing aircraft having a fuselage and two load-carrying rotors turning in opposite directions at a predetermined speed ratio relative to one another and having rotor blades of airfoil contour, means for controlling the directional heading of the fuselage comprising aerodynamic brakes at the tips of said rotor blades, each of said brakes comprising a brake member movable between an inactive position in which it is substantially within the airfoil contour of the rotor blade and an active position in which said brake member projects beyond the airfoil contour of the blade and produces drag, a pilot-controlled steering member movable in opposite directions from a neutral position and connections between said steering member and said brake members including selector means to move the tip brake members of one of said rotors from inactive to active position upon movement of the steering member in one direction from said neutral position and to maintain the tip brake members of said rotor in inactive position during movement of the steering member in the opposite direction from said neutral position.

5. In a rotary wing aircraft having a fuselage and two load-carrying rotors turning in opposite directions at a predetermined speed ratio relative to one another and having rotor blades, means for controlling the directional heading of the fuselage comprising aerodynamic brakes at the tips of said rotor blades, each of said brakes comprising a brake member movable between an inactive position and an active position in which it projects beyond the tip of the rotor blade and thereby produces drag and means for selectively controlling said tip brakes.

6. In a rotary wing aircraft having a fuselage and two load-carrying rotors turning in opposite directions at a predetermined speed ratio relative to one another and having rotor blades with airfoil surfaces for producing lift, means for controlling the directional heading of the fuselage comprising aerodynamic brakes at the tips of said rotor blades, said brakes comprising brake members movable between inactive positions and active positions in which they project from the tip portions of the rotor blades to produce drag without materially affecting the lift produced by said airfoil surfaces of the blades and means for selectively controlling said tip brakes.

7. In a rotary wing aircraft having a fuselage and two load-carrying rotors turning in opposite directions at a predetermined speed ratio relative to one another and having rotor blades, means for controlling the directional heading of the fuselage comprising means for adjusting the pitch of the blades of one of said rotors relative to that of the blades of the other of said rotors to balance the reaction torque of said rotors when the aircraft is hovering, aerodynamic brakes at the tips of the rotor blades, a steering member movable in opposite directions from a neutral position and connections between said steering member and said tip brakes to apply the tip brakes of one of said rotors by movement of the steering member in one direction from said neutral position to produce an unbalance of said reaction torque tending to turn the fuselage in one direction and to apply the tip brakes of the other of said rotors by movement of the steering member in the opposite direction from said neutral position to produce an unbalance of said reaction torque tending to turn the fuselage in the opposite direction.

8. In a rotary wing aircraft having a fuselage and two load-carrying rotors turning in opposite directions at a predetermined speed ratio relative to one another and having rotor blades, means for controlling the directional heading of the aircraft comprising means for varying the pitch of the blades of one of said rotors relative to that of the blades of the other of said rotors, a movable airfoil on said fuselage for applying a torque to said fuselage during forward flight, means for varying the position of said airfoil, aerodynamic brakes at the tips of the rotor blades, a steering member movable in opposite directions from a neutral position and connections between said steering member and said tip brakes to apply the tip brakes of one of said rotors by movement of the steering member in one direction from said neutral position and to apply the tip brakes of the other of said rotors by movement of the steering member in the opposite direction from said neutral position.

9. In a rotary wing aircraft having a fuselage and two load-carrying rotors turning in opposite directions at a predetermined speed ratio relative to one another and having rotor blades, means for controlling the directional heading of the fuselage comprising a movable airfoil on said fuselage for applying a torque to said fuselage during forward flight, means for varying the position of said airfoil, aerodynamic brakes at the tips of the rotor blades, a steering member movable in opposite directions from a neutral position and connections between said steering member and said tip brakes to apply the tip brakes of one of said rotors by movement of the steering member in one direction from said neutral position and to apply the tip brakes of the other of said rotors by movement of the steering member in the opposite direction from said neutral position.

10. In a rotary wing aircraft having a fuselage and two load-carrying rotors turning in opposite directions at a predetermined speed ratio relative to one another and having rotor blades, means for controlling the directional heading of the fuselage comprising aerodynamic brakes at the tips of said rotor blades, each of said brakes comprising a plunger longitudinally movable in the tip portion of the rotor blade between an active position in which said plunger projects beyond the tip of said blade and produces additional drag and an inactive position in which said plunger does not project beyond the tip of said blade, and control means for selectively moving said plungers to active position.

11. In a rotary wing aircraft having a fuselage and two load-carrying rotors turning in opposite directions at a selected speed ratio relative to one another and having variable pitch rotor blades, means for controlling the directional heading of the fuselage comprising means for varying the pitch of the blades of one of said rotors relative to that of the blades of the other of said rotors, aerodynamic brakes at the tips of said rotor blades and means for selectively actuating said tip brakes of a rotor turning in one direction while the tip brakes of a rotor turning in the opposite direction are inactive to produce a reaction torque differential tending to turn the fuselage about a vertical axis.

12. In a rotary wing aircraft having a fuselage and two load-carrying rotors turning in opposite directions at a selected speed ratio relative to one another and having rotor blades, means for controlling the directional heading of the fuselage comprising a movable airfoil on said fuselage for applying a torque to turn said fuselage, means for varying the position of said airfoil to vary said torque, aerodynamic brakes at the tips of the rotor blades, and means for selectively actuating said tip brakes of a rotor turning in one direction while the tip brakes of a rotor turning in the opposite direction are inactive to produce a reaction torque differential tending to turn the fuselage.

13. In a rotary wing aircraft having a fuselage and two coaxial load-carrying rotors turning in opposite directions at a predetermined speed ratio relative to one another and each having rotor blades, means for controlling the directional heading of the fuselage comprising aerodynamic brakes at the tips of said rotor blades, each of said brakes comprising a plate hingedly mounted on the tip of the respective rotor blade to swing about an axis approximately perpendicularly to the chordal plane of the blade between an inactive position in which it is substantially normal to the length of the blade and operative positions at an angle to said inactive position, said plate producing drag varying with the angular position of said plate, and means for simultaneously swinging the tip brake plates of the blades of one of said rotors to like operative positions and maintaining them in said positions while the tip brake plates of the blades of the other of said rotors remain in inactive position.

14. In a rotary wing aircraft having a fuselage and two coaxial load-carrying rotors turning in opposite directions at a constant speed ratio relative to one another and each having rotor blades, means for controlling the directional heading of the fuselage comprising aerodynamic brakes at the tips of said rotor blades, each of said brakes comprising a plate hingedly mounted on the tip of the respective rotor blade to swing about an axis approximately perpendicular to the chordal plane of the blade between an inactive position in which it is substantially perpendicular to the length of the blade and variable operative positions at an angle to said inactive position, said plate producing drag varying with the angular position of said plate, a steering member movable in opposite direction from a straight-ahead position and operative connections between said steering member and said plates to position all of said plates in inactive position when said member is in straight-ahead position, to swing said plates of all the blades of one of said rotors angularly from said inactive position to like operative positions when said member is moved in one direction from said straight-ahead position, said plates on the blades of the other of said rotors remaining in inactive position, and to swing said plates of all the blades of said other of said rotors angularly from inactive position to like operative positions when said member is moved in the opposite direction from said straight-ahead position, said plates on the blades of said first mentioned rotor remaining in inactive position.

15. Directional control means according to claim 14, in which said operative connections comprise mechanical connections between said steering member and said plates to swing said plates to selected angular position according to the amount of movement of said steering member from straight ahead position.

References Cited in the file of this patent

UNITED STATES PATENTS

| | | |
|---|---|---|
| 1,023,233 | Williams | Apr. 16, 1912 |
| 1,771,053 | Martin | July 22, 1930 |
| 2,456,485 | Bendix | Dec. 14, 1948 |

FOREIGN PATENTS

| | | |
|---|---|---|
| 446,509 | Great Britain | Apr. 27, 1936 |